C. H. APPEL & J. S. ROTHENBERGER.
BRAKES FOR LIGHT VEHICLES.
No. 180,820. Patented Aug. 8, 1876.
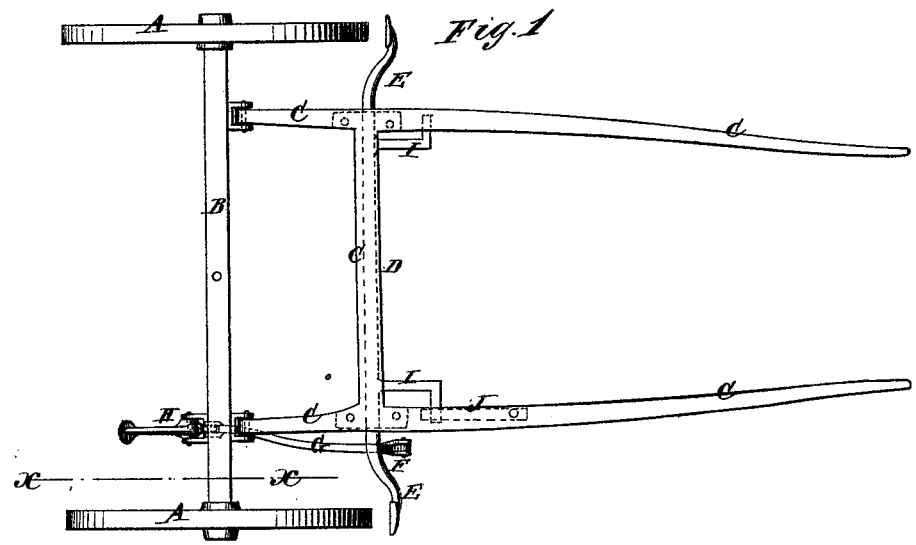
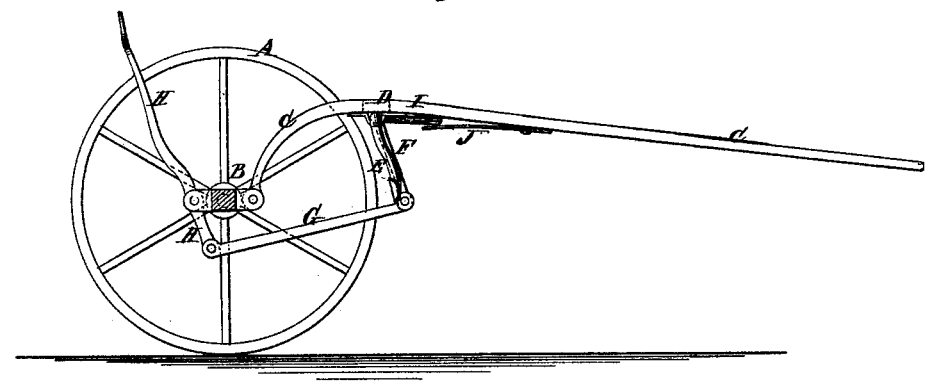
WITNESSES:
A. W. Alyngvist
John Goethals
INVENTOR:
C. H. Appel
BY J. S. Rothenberger
ATTORNEYS

UNITED STATES PATENT OFFICE.

CHARLES H. APPEL AND JOSEPH S. ROTHENBERGER, OF SHIMERVILLE, PENNSYLVANIA.

IMPROVEMENT IN BRAKES FOR LIGHT VEHICLES.

Specification forming part of Letters Patent No. 180,820, dated August 8, 1876; application filed June 6, 1876.

*To all whom it may concern:*

Be it known that we, CHARLES H. APPEL and JOSEPH S. ROTHENBERGER, of Shimerville, in the county of Lehigh and State of Pennsylvania, have invented a new and useful Improvement in Brakes for Buggies and other Spring-Carriages, of which the following is a specification:

Figure 1 is a top view of the forward wheels, axle, and thills of a buggy to which our improved brake has been applied. Fig. 2 is a side view of the same, the axle being cut off through the line $x$ $x$, Fig. 1.

Similar letters of reference indicate corresponding parts.

The improvement relates to a brake for buggies, all of whose parts are connected with the shafts and front axle, so that the springs are subjected to no strain when the brake is operated, and the arrangement of the parts such that they are out of the way and not liable to be bent or broken from contact with any object, as hereinafter fully described.

A represents the forward wheels, B the forward axle, and C the thills, of a buggy, about the construction of which parts there is nothing new. To the thills C or to the pole of a vehicle, is pivoted a shaft, D, to the ends of which are attached, or upon them are formed, arms E, curving downward and outward, and having brake-shoes formed upon or attached to their outer ends in such positions as to rest against the wheels A.

To the shaft D, near one end, is attached, or upon it is formed, a downwardly-projecting arm, F, to the lower end of which is pivoted the forward end of a connecting-rod, G. The rear end of the connecting-rod G is pivoted to the lower end of a lever, H, which is pivoted to the axle B by a clip or other convenient means, and the upper end of which projects into such a position that it may be conveniently operated by the driver with his foot.

To the forward side of the shaft D, beneath the thills C, or nearly so, are attached arms I, which project forward beneath the said thills C, and the forward ends of which rest upon the free ends of springs J, attached to the under side of said thills, so as to withdraw the brake-shoes from the wheels A as soon as the lever H is released from the pressure of the driver's foot, and hold them away from said wheels until it may be again necessary to apply the brakes.

By this construction, in applying the brakes there is no strain upon the springs, as there must necessarily be when the brake is attached to or connected with the body of the vehicle.

We do not claim, broadly, the application of a brake mechanism to the shafts of a wagon; but,

Having thus described our invention, we claim as new and desire to secure by Letters Patent—

The brake-lever H, pivoted to the front axle B, the rock-shaft D, having brake-arms E and arms I and F projecting at points contiguous to the shafts C, all combined as shown and described, for the purpose specified.

CHARLES H. APPEL.
JOSEPH S. ROTHENBERGER.

Witnesses:
LEON L. SNYDER,
SEVINUS MILLER.